United States Patent [19]

Hirota

[11] Patent Number: 5,177,623
[45] Date of Patent: Jan. 5, 1993

[54] IMAGE PROCESSING APPARATUS AND METHOD

[75] Inventor: Yoshihiko Hirota, Osaka, Japan

[73] Assignee: Minolta Camera Kabushiki Kaisha, Osaka, Japan

[21] Appl. No.: 849,636

[22] Filed: Mar. 5, 1992

Related U.S. Application Data

[63] Continuation of Ser. No. 630,387, Dec. 18, 1990, which is a continuation of Ser. No. 333,620, Apr. 4, 1989, abandoned.

[30] Foreign Application Priority Data

Apr. 7, 1988 [JP] Japan .................. 63-86492

[51] Int. Cl.$^5$ ............................ H04N 1/40
[52] U.S. Cl. ........................ 358/457; 358/455; 358/456
[58] Field of Search .......... 358/429, 448, 456, 455, 358/457, 75, 80, 404, 444, 458, 460, 465; 382/33

[56] References Cited

U.S. PATENT DOCUMENTS

| | | | |
|---|---|---|---|
| 4,547,811 | 10/1985 | Ochi et al. | 358/455 |
| 4,674,861 | 6/1987 | Kawamura | 355/4 |
| 4,680,625 | 7/1987 | Shoji et al. | 358/75 |
| 4,698,691 | 10/1987 | Suzuki et al. | 358/458 |
| 4,941,057 | 7/1990 | Lehmbeck et al. | 358/456 |
| 5,075,872 | 12/1991 | Kumagai | 358/465 |

FOREIGN PATENT DOCUMENTS 58-33361 2/1983 Japan .
60-180371 9/1985 Japan .

Primary Examiner—Edward L. Coles, Sr.
Assistant Examiner—Jerome Grant, II
Attorney, Agent, or Firm—Willian Brinks Olds Hofer Gilson & Lione

[57] ABSTRACT

An image processing apparatus for converting multi-tone image signals to binary image signals in reference to threshold levels arranged in matrix to form a threshold pattern, which apparatus comprises a generator for generating the multi-tone image signals, a first memory storing a plurality of threshold patterns which are different from each other, a selector for selecting one of the threshold patterns, a high-speed memory for storing the threshold patterns selected by the selector from first memory, a writing unit for writing the selected thereshold pattern in the high-speed memory from the first memory, a reading unit for reading out the selected threshold pattern from the high-speed memory, and a converter for converting the multi-tone image signals generated by the generator to the binary image signals in reference to the threshold levels of the selected threshold pattern which are read out from the high-speed memory by the reading unit.

13 Claims, 7 Drawing Sheets

Yellow(Y)

Magenta(M)

Cyan(C)

Black(K)

IMAGE PROCESSING APPARATUS AND METHOD

This application is a continuation of application Ser. No. 07/630,387, filed Dec. 18, 1990, which is a continuation of application Ser. No. 07/333,620, filed Apr. 4, 1989, now abandoned.

BACKGROUND OF THE INVENTION

1. Field of the Invention

The present invention relates to an apparatus for and a method of digitalizing color image data of a color image according to a dither method so that the color image can be displayed in intermediate tone by a binary display device.

2. Description of Related Art

In general, in a digitally controlled CRT display device or printer, or a digital copying machine, an image is composed of a plurality of dots of uniform size whose coordinates are digitally given, and each of those dots is indicated by a binary code of white or black (color). As a method of displaying an intermediate tone of the image with any one of those devices, a dither method is well known in the art.

According to the dither method, image data of the image of intermediate tone is digitalized in reference to threshold values which are represented by suspected random numbers. Even though the image data is added with the suspected random numbers and then digitalized, the image data remains equivalent. The dither method generally in use is an organized dither method in which a matrix of dither patterns is cyclically used as the suspected random numbers.

Where the image is in color, the color image is divided into color image data each representative of one of the colors used in the color image and the above described dither method is then applied to each color image data. In such case, in order to avoid any possible generation of Moire pattern which would result from an error in position of the dots of each color or by any other reason, different dither patterns are used for those color image data.

According to the prior art image processing apparatus in which the image data are digitalized according to the dither method, such as disclosed in, for example, the Japanese Laid-open Patent Publication No. 60-180370 published Sep. 14, 1985, it is necessary to accomplish a digitalization (which may be referred to as a "dither processing") at a high speed on a real-time basis in reference to the dither patterns and, therefore, the dither patterns are stored in a bipolar read-only memory so that during the dither processing the dither pattern can be read out from the bipolar read-only memory.

It has, however, been found that, although the bipolar read-only memory operated at high speed, the electric power consumption thereof is considerable and, therefore, the storage of the plural dither patterns in the bipolar read-only memory only for the purpose of the dither processing of the color image tends to pose problems associated with the electric power source and the price.

SUMMARY OF THE INVENTION

The present invention has been devised with a view to substantially eliminating the above discussed problems inherent in the prior art image processing apparatus as well as the use of the expensive bipolar read-only memory therein and has for its primary object to provide an improved image processing apparatus effective to accomplish the dither processing at high speed with no use being made of the bipolar read-only memory.

In order to accomplish the above described object, the present invention provides an image processing apparatus for converting multi-tone image signals to binary image signals in reference to threshold levels arranged in matrix to form a threshold pattern, which apparatus comprises a generating means for generating the multi-tone image signals; a first memory means storing a plurality of threshold patterns which are different from each other; a selecting means for selecting one of the threshold patterns; a second memory means for storing the threshold patterns selected by said selecting means from the first memory means; a writing means for writing the selected threshold pattern in the second memory means from said first memory means; a reading means for reading out the selected threshold pattern from said second memory means; and a converting means for converting the multi-tone image signals generated by the generating means to the binary image signals in reference to the threshold levels of the selected threshold pattern which are read out from the second memory means by said reading means.

In a preferred embodiment of the present invention, the first memory means may be a non-volatile ROM (read-only memory) and the second memory means may be a RAM (random access memory).

According to the present invention, the plural dither patterns utilizable in the practice of the dither processing of each color image data are stored in the first memory means, and any one of the dither patterns corresponding to the color image data to be subjected to the dither processing is transferred to the first memory means prior to the actual dither processing. On the other hand, during the actual dither processing, the dither pattern transferred to and stored temporarily in the first memory means is read out in readiness for the digitalization which subsequently takes place.

The second memory means or RAM which may be utilizable in the practice of the present invention must have a memory capacity sufficient to accommodate the maximum possible size of one of the dither patterns while having a high speed operating feature. On the other hand, the first memory means or non-volatile ROM which may be utilizable in the practice of the present invention may be an EPROM (electrically programmable read-only memory) of MIS type or any other equivalent which is low in power consumption and inexpensive.

BRIEF DESCRIPTION OF THE DRAWINGS

This and other objects and features of the present invention will become clear from the following description taken in conjunction with the preferred embodiments thereof with reference to the accompanying drawings, in which.

DESCRIPTION OF THE PREFERRED EMBODIMENT

Figure 1:
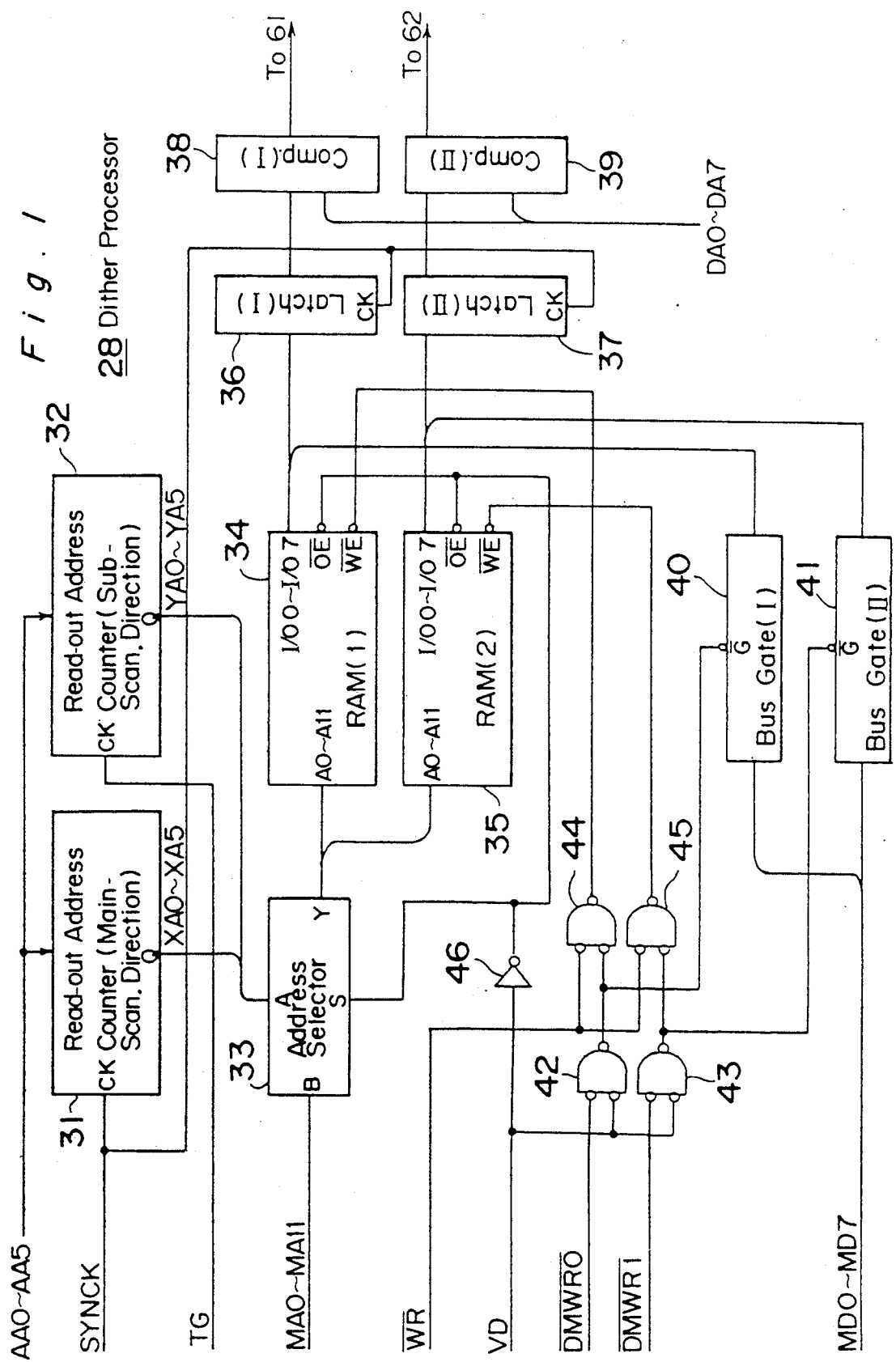
FIG. 1 is a circuit block diagram showing a dither processor included in an intermediate tone processing unit according to a preferred embodiment of the present invention.

Before the description of the present invention proceeds, it is to be noted that like parts are designated by like reference numerals throughout the accompanying drawings.

Figure 5:
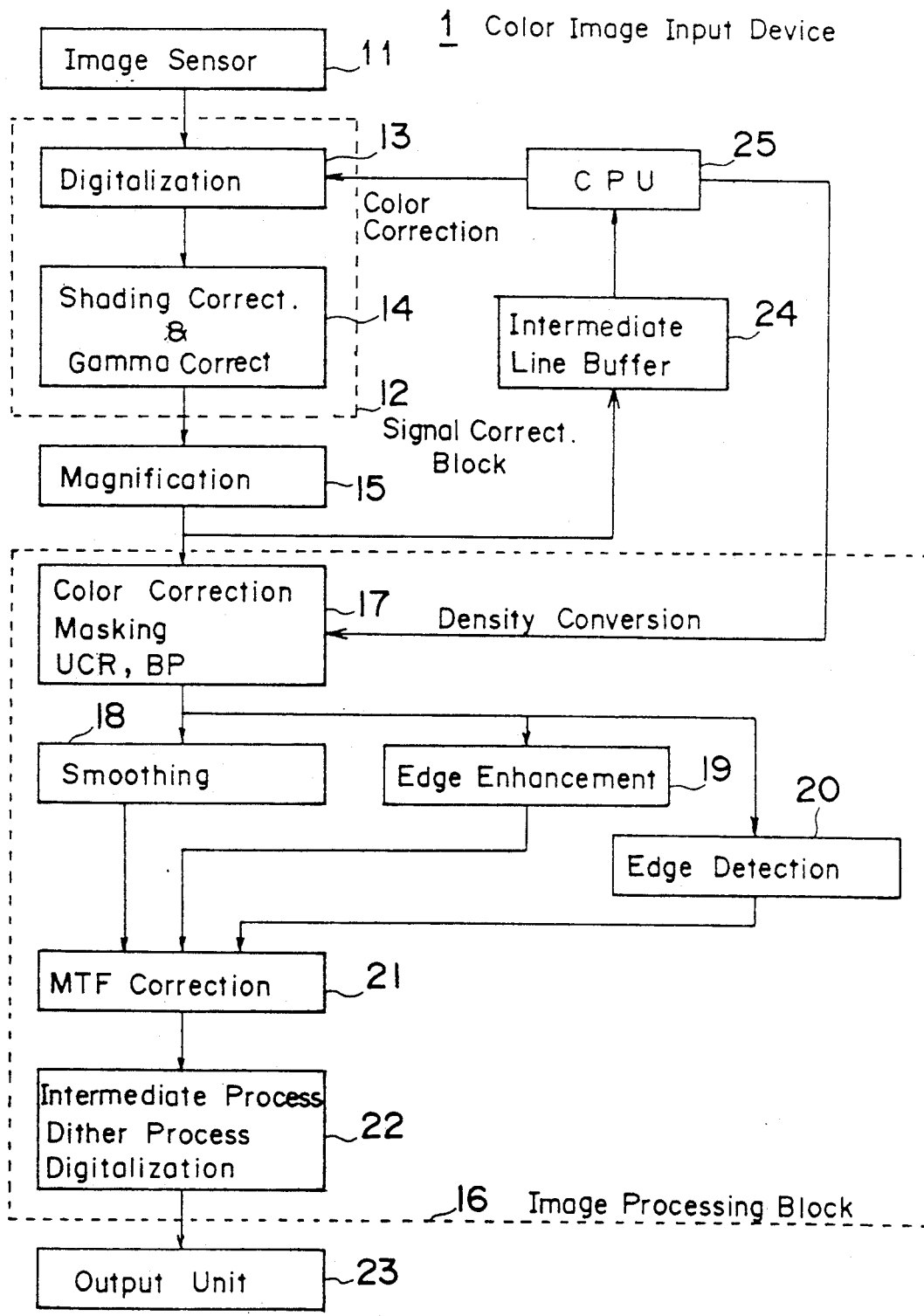
FIG. 5 is a circuit block diagram showing an electric circuit used in a color image input device.

Referring first to FIG. 5, there is shown, in block circuit form, an electric circuit employed in a color image input device 1 operable to read original color images and to output image data to a printer or the like after various processes have been effected to the original color images.

An output from an image sensor 11 which has received radiations reflected from the original image is supplied to a signal correcting block 12 to remove various strains caused during the reading of the original image thereby to correct the original image. This signal correcting block 12 includes a digitalizing unit 13 including an analog-to-digital converter and operable to quantify the original image read out by the image sensor 11 and a signal correcting block 14 operable to effect a shading correction and a gamma correction.

In a magnification processing unit 15, enlargement or reduction of the image is carried out by an electric magnifying circuit of any known construction designed to operate according to a trimming method, a calculating method or an interpolation method.

An image processing block 16 includes a color corrector 17 capable of performing a masking process for forming, from color image data of three primary colors R, G and B, color image data of three primary colors Y (yellow), M (magenta) and C (cyan) of toning material, which may be a toner (developing material) in the case of an electrophotographic recording device or ink in the case of an ink jet printer, a smoothing unit 18 for removing noise components contained in the image to smoothen it, an edge enhancement unit 19, an edge detector 20, MTF corrector 21 and an intermediate tone processing unit 22 capable of performing the dither processing according to the organized dither method. The image data receive various image conversion processes in this image processing block 16 and are subsequently outputted to an output unit 23. Reference numeral 24 represents an intermediate line buffer and reference numeral 25 represents a central processing unit (CPU).

Figure 8:
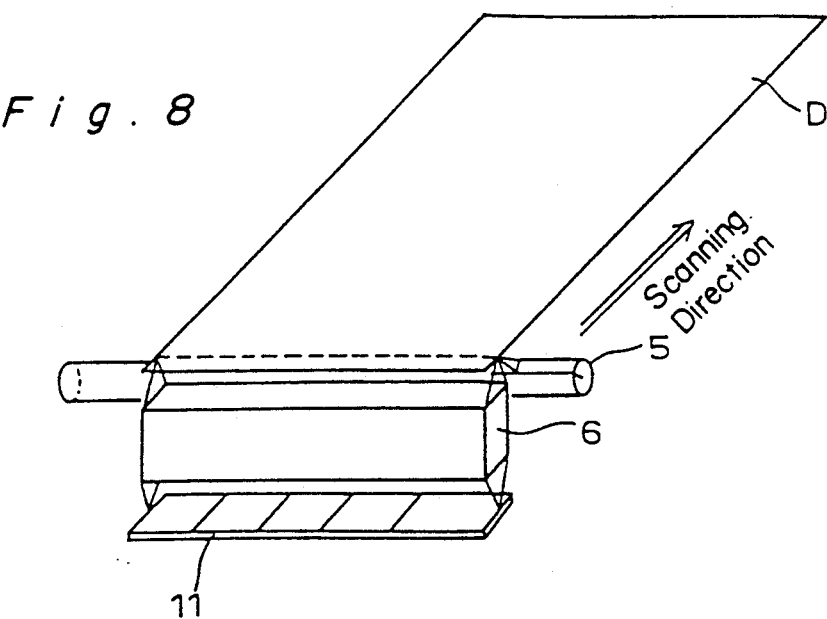
FIG. 8 is a schematic perspective view of an optical system of the color image input device.
Figure 9:
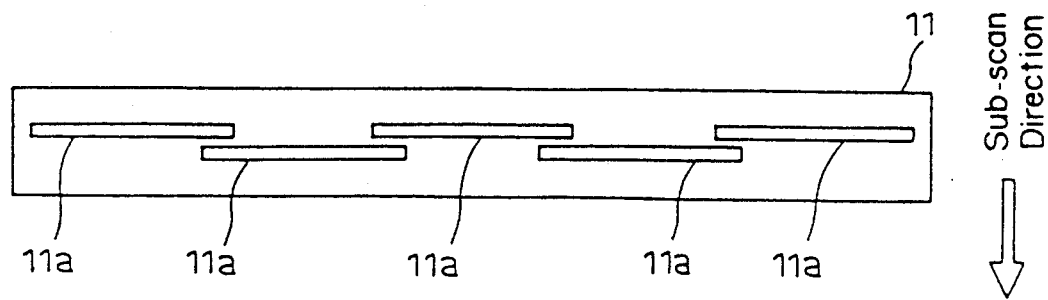
FIG. 9 is a plan view of an image sensor.

An optical system of a color image input device 1 is best shown in FIG. 8. An original D placed on a transparent glass support is line-scanned in a subscanning direction by a scanner comprising a fluorescent lamp 5, a rod lens array 6 and the image sensor 11. As best shown in FIG. 9, the image sensor 11 includes five contact-type CCD sensor chips 11a alternately laid transversely (in a direction conforming to a main scanning direction), every two of said sensor chips 11a being spaced a pitch equal to four dots in a direction laterally (in a direction conforming to the subscanning direction) of each other. Because of the presence of the pitch corresponding to the four dots between every two sensor chips 11a which are placed laterally of each other, a signal output from one of the CCD sensor chips 11 which is rearmost with respect to the subscanning direction will be delayed a time corresponding to four lines, which delay can be compensated for by delaying a signal output from one of the CCD sensor chips 11a which is foremost with respect to the subscanning direction for a length of time corresponding to four lines.

Figure 10:
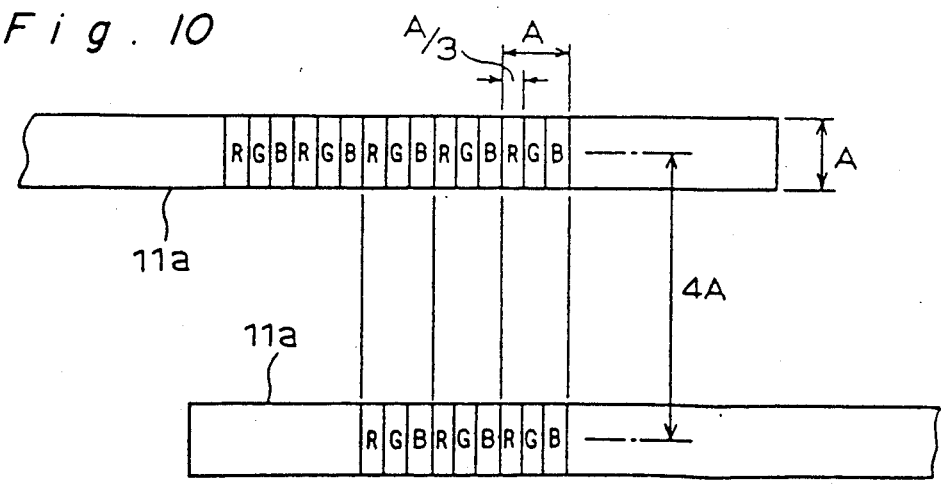
FIG. 10 is a schematic diagram showing a portion of the image sensor of FIG. 9 on an enlarged scale.
Figure 11A:
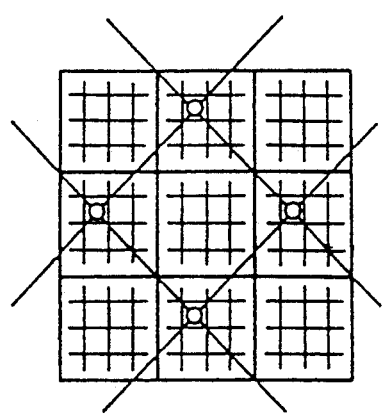
FIGS. 11(a) to 11(d) are schematic diagrams showing respective dither patterns.
Figure 11B:
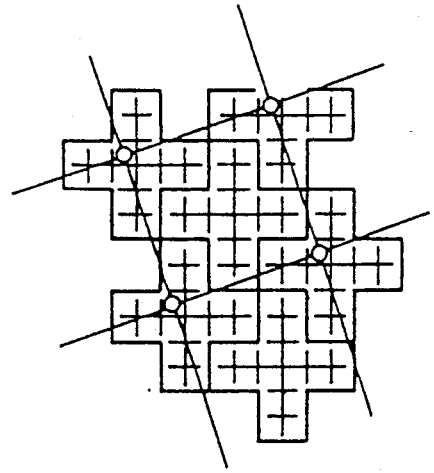
Figure 11C:
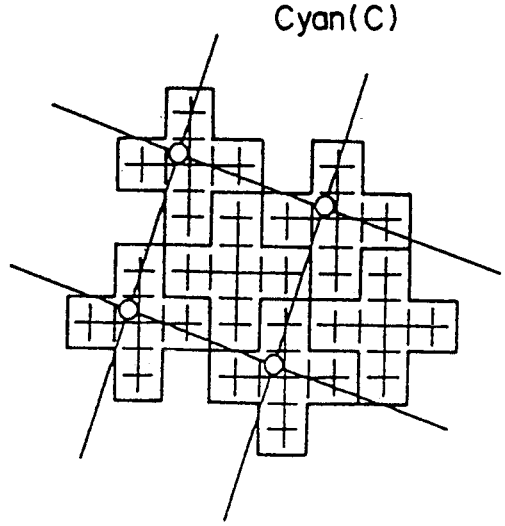
Figure 11D:
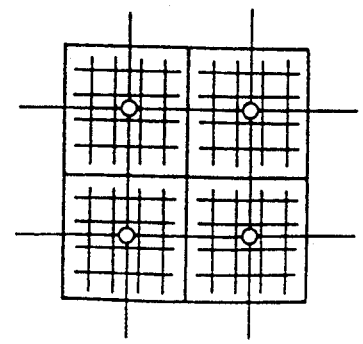

Each of the CCD sensor chips 11a is of a construction wherein, as best shown in FIG. 10 showing one end portion of each sensor chips 11a on an enlarged scale, an element corresponding to each color of R, G and B is arranged within one dot (one picture element) in the main scanning direction so that a color image data of each of the three primary colors R, G and B can be obtained.

The details of the dither processor 28 included in the intermediate tone processing unit 22 and operable to digitalize the image data with the use of the dither patterns are best shown in FIG. 1.

As shown therein, the color image data DA0 to DA7 supplied from the MTF processor 21 are digitalized by the dither processor 28 with the use of the dither patterns which are different for each color, which processor 28 subsequently outputs binary coded data. The reason that the different dither patterns are employed for each color is for the purpose of avoiding any possible formation of Moire patterns which would otherwise result from any error in position of dots at the time of printing carried out with the use of a print head.

FIGS. 11(a) to 11(d) illustrate examples of those different dither patterns associated with respective colors Y (yellow), M (magenta), C (cyan) and K (black), all of them having a different screen angle.

Referring back to FIG. 1, the dither processor 28 comprises dither RAMs 34 and 35 for the temporary storage of the dither patterns, latches 36 and 37 for synchronizing data (threshold values) of the dither patterns read out from the dither RAMs 34 and 35 with the color image data DA0 to DA7, comparators 38 and 39 for comparing the data supplied from the latches 36 and 37 with the color image data DA0 to DA7 thereby to digitalize the color image data DA0 to DA7, bus gates 40 and 41 for selectively closing and opening CPU data buses for writing the dither patterns in the dither RAMs 34 and 35, read-only address counters 31 and 32 for generating addresses when the dither patterns are read out from the dither RAMs 34 and 35, an address selector 33 for selecting one of the read-only addresses generated by the read-only address counters 31 and 32 and a write-in address supplied from CPU 25, a plurality of gates 42 to 45 for selecting one of them at the time of writing in the dither RAMs 34 and 35, and a gate 46 for selecting one of write-in and read-out functions relative to the dither RAMs 34 and 35.

The two dither RAMs 34 and 35 are used for storing the different kinds of the dither patterns such as those for 16 tones and those for 64 tones and, within an effective area of the original in the subscanning direction (in the vertical direction), the read-out function takes place when a vertical synchronizing signal VD becomes active ("H" in logical state). When the vertical synchronizing signal VD is rendered to be in "L" in logical state outside the effective area, the write-in function takes place and, at this time, when a signal S1 (a DMWR0 signal in a low active state) for the write-in function is rendered active or when a signal S2 (a DMWR1 signal in a low active state) is rendered active, the data can be written in the dither RAM 34 or the dither RAM 35, respectively.

Specifically, when the vertical synchronizing signal is in a logical low level state, it means that the scanner is in condition before the actual scanning operation or during the returning operation of the scanner, and therefore, the dither patterns for the color image data to be subsequently printed are written in the dither RAMs 34 and 35.

At the time the data is written in either one of the dither RAMs 34 and 35, one of the bus gates 40 and 41 which corresponds thereto is opened to permit the inputting of the data from the CPU data buses MD0 to MD7. Also, the address selector 33 selects CPU address buses MA0 to MA11 and a writing address is specified from CPU 25.

Figure 2:
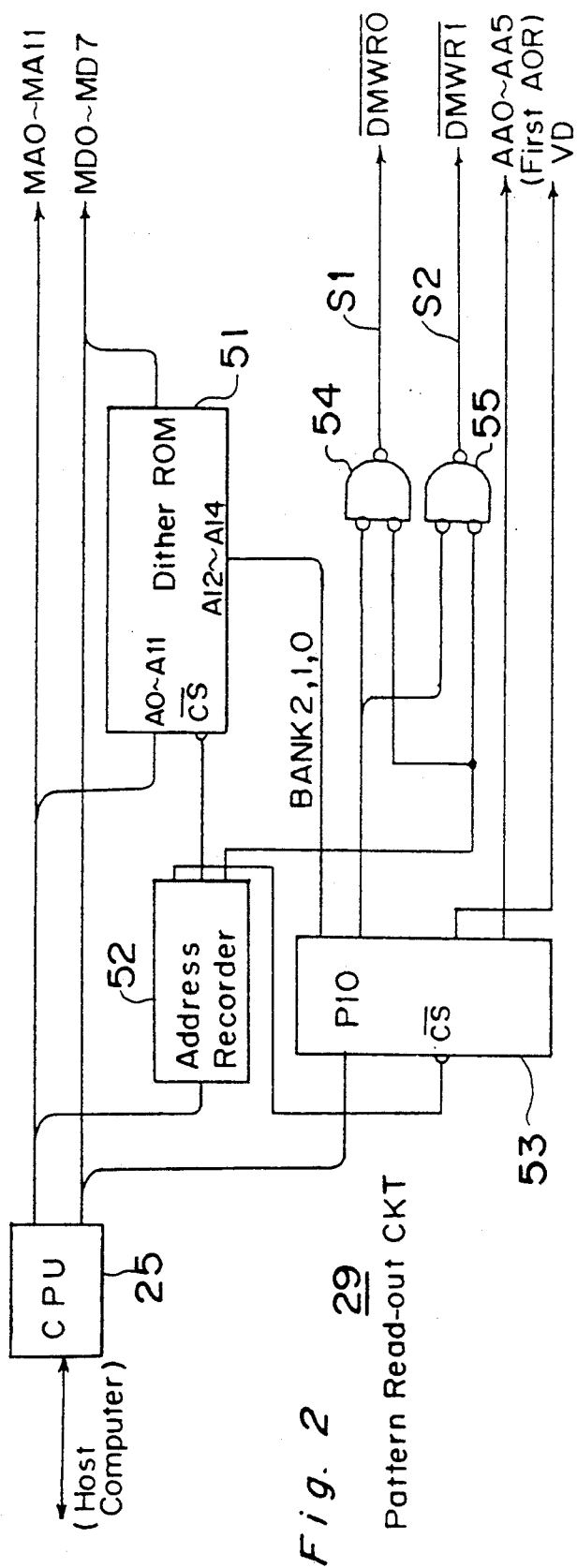
FIG. 2 is a circuit block diagram showing a pattern read-out circuit included in the intermediate tone processing unit.

The details of a pattern read-out circuit 29 included in the intermediate tone processing unit 22 are shown in FIG. 2. As shown therein, the pattern read-out circuit 29 is operable to read out the dither patterns stored in the dither ROM 51 and send them onto a CPU data bus for the purpose of writing the dither patterns in the dither RAMs 34 and 35.

The dither ROM 51 stores eight types of dither patterns which include two groups respectively having four dither patterns corresponding to each of Y, M, C and K color image data. The bank of the dither ROM 51 can be switched over in response to a 3-bit bank switching signal BANK inputted to address terminals A12 to A14 from an input/output port 53 thereby to select one of the eight types of the dither patterns. At the same time, CPU 25 indicates a read-out address of the dither ROM 51 by CPU address buses MA0 to MA11 so that the selected dither pattern can be read out to output a pattern data to the CPU data bus.

The two types of the dither patterns for each color image data are for writing in the two dither RAMs 34 and 35 in correspondence therewith and this can take place through the gates 54 and 55 in response to outputs from an address decoder 52 and the input/output port 53 thereby to permit it to output the previously described signals S1 and S2 necessary to select the dither RAMs 34 and 35 for writing.

Figure 7:
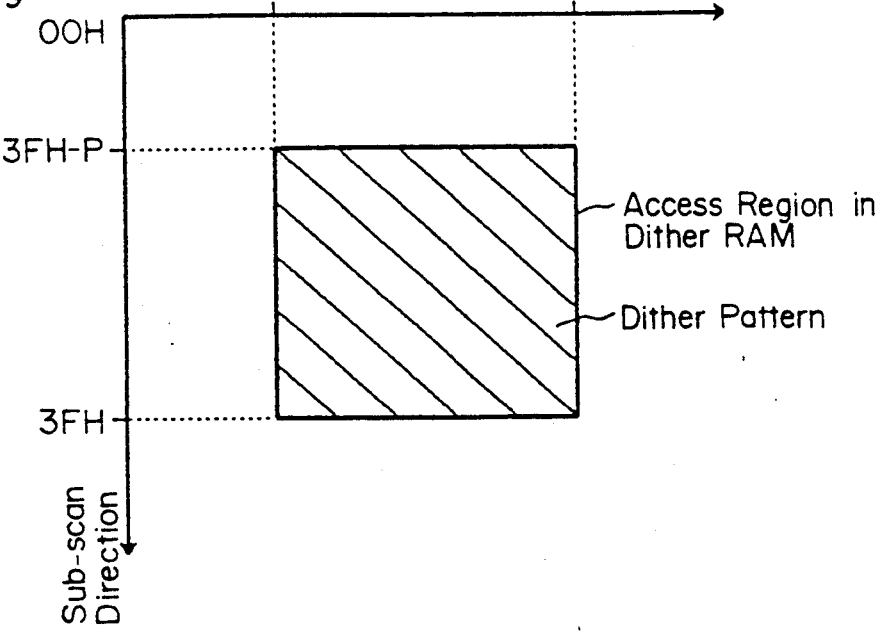
FIG. 7 is a schematic diagram showing the status of a dither RAM in which a dither pattern DP1 is written.

FIG. 7 illustrates the condition of one of the dither RAMs, for example, that of the dither RAM 34, in which a matrix size P×P of dither pattern DP1 is written in. The dither RAM 34 is capable of accommodating the dither pattern of a matrix of 3FH×3FH (H representing a hexadecimal number) in maximum size and the dither pattern DP1 can be written at addresses from (3FH−P) to 3FH in both of the main scanning direction and the subscanning direction.

From the input/output port 53, initial value setting signals AA0 to AA5 and the vertical synchronizing signal VD are outputted in accordance with a command from CPU 25.

Referring back to FIG. 1, when the dither patterns are to be read out from the dither RAMs 34 and 35, the address selector 33 selects read-out addresses XA0 to XA5 and YA0 to YA5 from the read-out address counters 31 and 32 and then allocate upper and lower bits thereto before they are outputted to address terminals A0 to A11 of the dither RAMs 34 and 35.

Those read-out address counters 31 and 32 are used to generate addresses in the main scanning direction and the subscanning direction of the dither patterns and comprises preset counters capable of counting 0H to 3FH (or 0 to 63 according to the decimal numbering system).

In those read-out address counters 31 and 32, initial values (3FH−P) are initially set by the initial value setting signals AA0 to AA5 according to the matrix size (P×P) of the dither patterns written in the dither RAMs 34 and 35. The main scanning direction read-out address counter 31 performs a count-up operation in response to an image clock signal SYNCK synchronized with the set-up of the image data DA0 to DA7 and, when a maximum count value (3FH) is reached, the counting operation can be restarted from the initial value (3FH−P). The subscanning direction read-out address counter 32 performs a count-up operation in response to a horizontal synchronizing signal TG and, when a maximum count value (3FH) is reached, the counting operation can be restarted from the initial value (3FH−P).

By the address specification performed by the read-out address counters 31 and 32, the data of the dither patterns stored in the dither RAMs 34 and 35 can be sequentially read out, which data are in turn latched in the latches 36 and 37 for comparison by the comparators 38 and 39 with the image data DA0 to DA7.

In this way, the image data DA0 to DA7 are digitalized against the threshold value which are represented by the data of the dither patterns, and digitalized data capable of displaying in intermediate tone can be serially outputted from the comparators 38 and 39. It is to be noted that the digitalized data represents white when in a logic "L" state and one of the colors yellow, magenta and cyan or black when in a logic "H" state.

Figure 3:
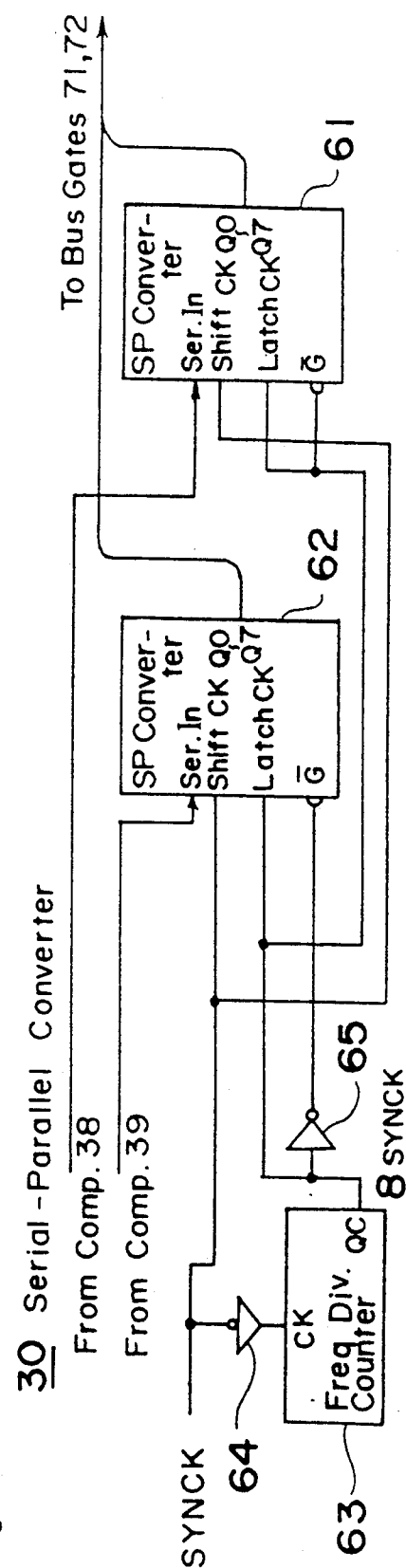
FIG. 3 is a circuit block diagram showing a serial-to-parallel converter included in the intermediate tone processing unit.
Figure 6:
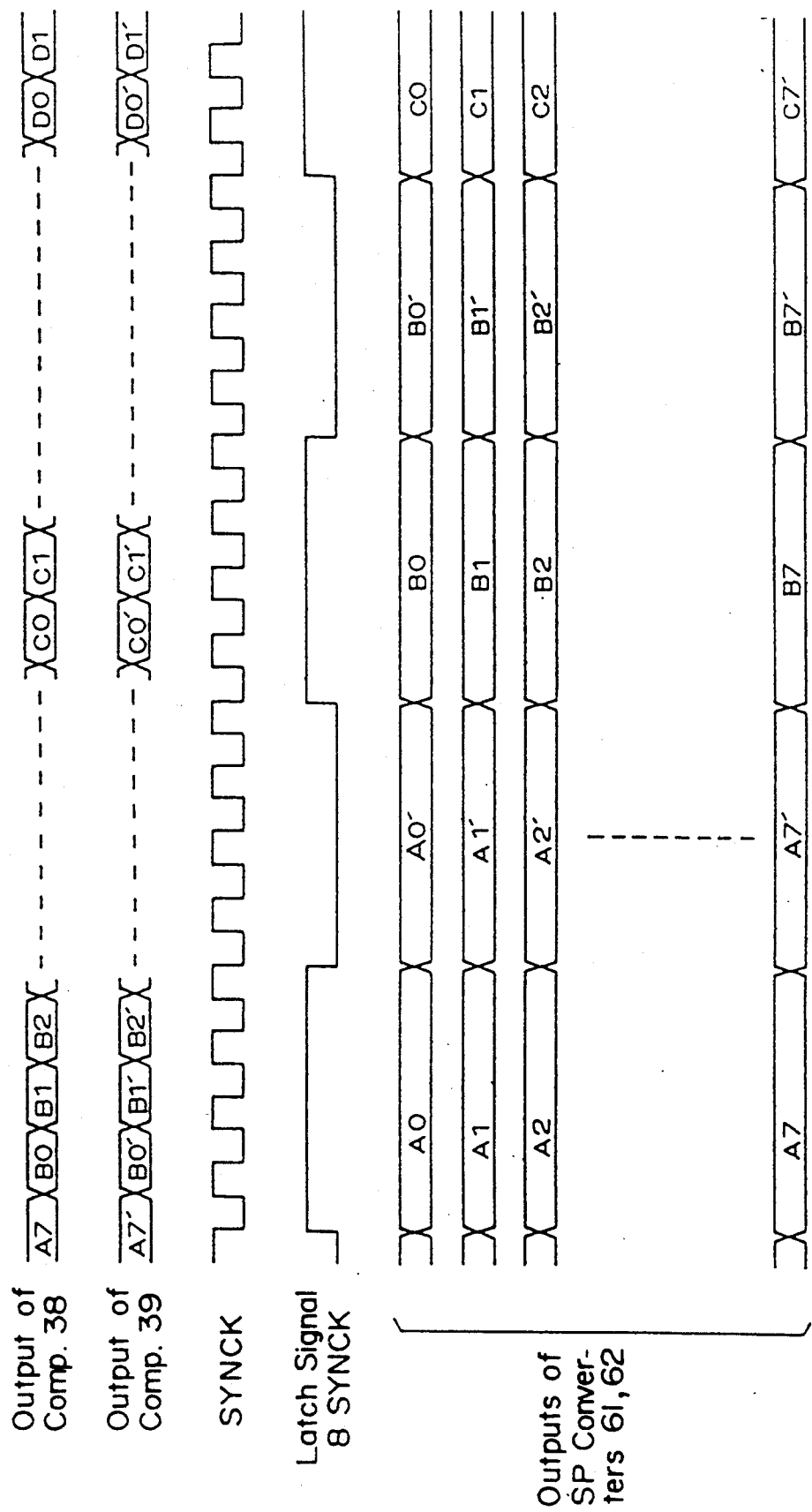
FIG. 6 is a timing chart showing the sequence of operation of the serial-to-parallel converter.

FIG. 3 illustrates a serial-to-parallel converter circuit 30 included in the intermediate tone processing unit 22. This serial-to-parallel converter circuit 30 operates to convert serial data, outputted from the comparators 38 and 39, into 8-bit parallel data as shown in the timing chart of FIG. 6.

The data outputted from the comparators 38 and 39 are inputted to serial input terminals of respective SP converter 61 and 62 which are shifted in response to the image clock signals SYNCK and are subsequently latched in response to a latch signal 8SYNCK which is the image clock signal SYNCK divided by eight by a frequency dividing counter 63. The 8-bit parallel data so latched are shared on a time basis with respect to each other and are outputted to the bus gates 71 and 72 of the output unit 23 through the image data bus.

Figure 4:
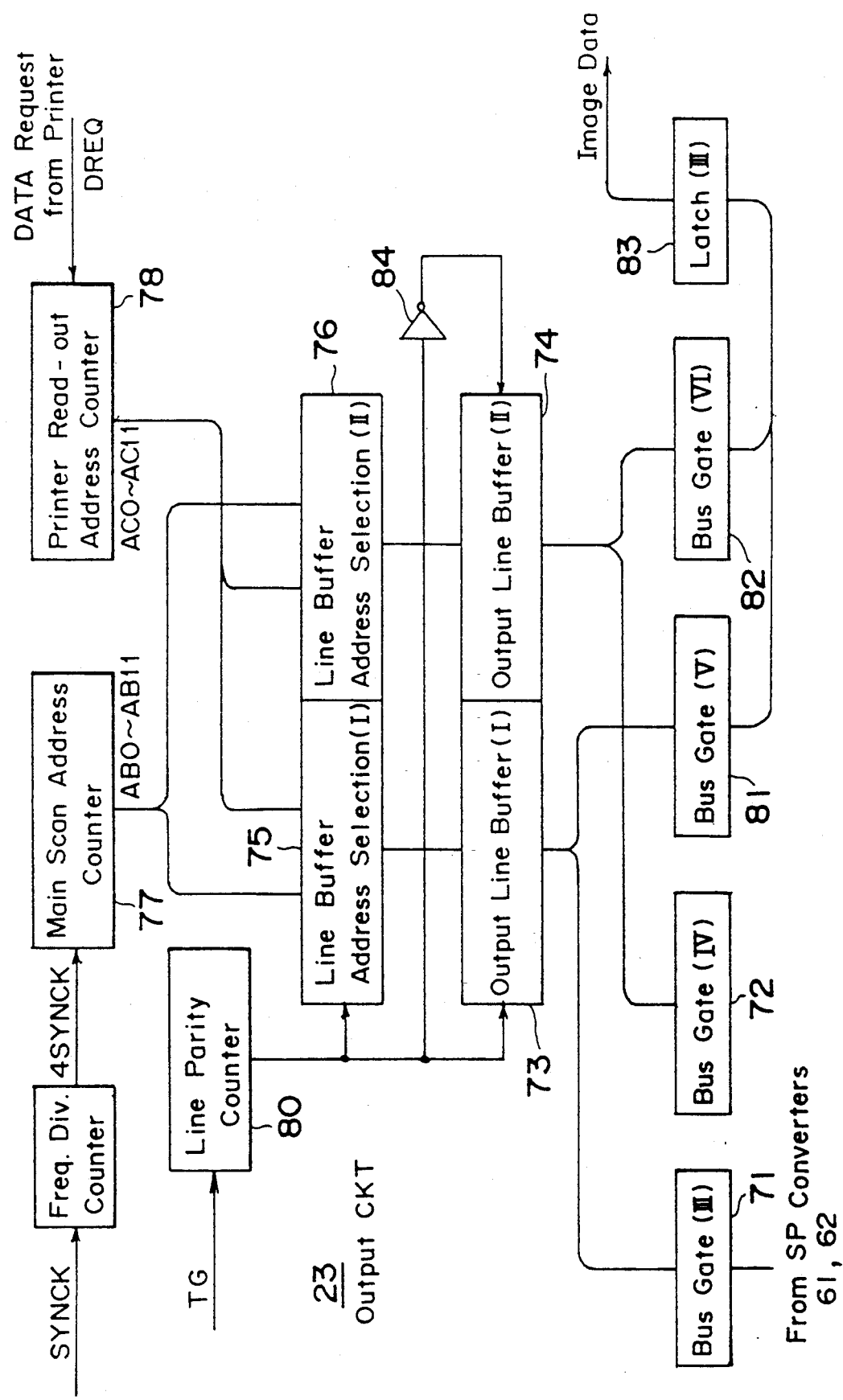
FIG. 4 is a circuit block diagram showing an output circuit included in the intermediate tone processing unit.

The details of the output unit 23 are shown in FIG. 4 in block diagram. As shown therein, a main scan address counter 77 counts signals 4SYNCK which is the image clock signal SYNCK divided by four by a frequency dividing counter 79, thereby to generate addresses AB0 to AB11. A printer read-out address counter 78 counts data request signals DREQ provided by a printer thereby to generate addresses AC0 to AC11. Those address signals, after having been selected by line buffer address selectors 75 and 76, specify addresses of output line buffers 73 and 74.

A line parity counter 80 outputs "L" and "H" signals alternately each time the horizontal synchronizing signal TG is counted, for controlling write-in and read-out operations of the output line buffers 73 and 74.

In other words, in the output line buffers 73 and 74, the write-in and read-out operations take place alternately for each line in the subscanning direction, and the address for the write-in operation and the address for the read-out operations are specified by the addresses AB0 to AB11 based on the image clock signal SYNCK and the addresses AC0 to AC11 based on the data request signals DREQ from the printer, respectively. The line parity counter 80 is used to effect a switching between the above described operations for each line, that is, an odd-numbered line and an even-numbered line.

The switching operation performed by the line parity counter 80 is summarized in Table 1 below.

TABLE 1

| | Output of Line Parity Counter 80 | |
|---|---|---|
| | L | H |
| Bus Gate 71: | Enabled | Disabled |
| Bus Gate 72: | Disabled | Enabled |
| Line Buffer 73: | Write-in Ope. | Read-out Ope. |
| Line Buffer 74: | Read-out Ope. | Write-in Ope. |
| Selector 75 | AB0 to AB11 selected | AC0 to AC11 selected |
| Selector 76 | AC0 to AC11 selected | AB0 to AB11 selected |
| Bus Gate 81: | Disabled | Enabled |
| Bus Gate 82: | Enabled | Disabled |

The image data read out from the output line buffers 73 and 74 are outputted to the printer (not shown) through the bus gates 81 and 82 and the latch 83.

According to the above described embodiment of the present invention, prior to the dither processing of the color image data taking place, that is, before the original D is scanned, one of the eight dither patterns in the dither ROM 51, which is used for the dither processing of such color image data is transferred to one of the dither RAMs 34 and 35 and the dither processing can take place on a real-time basis while the dither patterns are read out from the dither RAMs 34 and 35.

Accordingly, the dither ROM 51 utilizable in the practice of the present invention need not be of a type capable of operating at a high speed such as, for example, a bipolar ROM, and, accordingly, a low speed ROM such as, for example, EPROM of MIS type can be employed therefor. Not only is the low speed ROM inexpensive, but also the use of the low speed ROM according to the present invention makes it possible to minimize electric power consumption.

Also, according to the illustrated embodiment of the present invention, for any one of the dither RAMs 34 and 35, any random access memory of a size capable of accommodating one of the dither patterns which may be of largest size accommodated in the dither ROM 51. For example, the dither RAM 34 has a 4 KByte storage capacity and is effective to accommodate the dither patterns in a matrix form of 3FH×3FH in maximum size. Accordingly, so long as the dither patterns are of a size within this matrix size, it is possible to download from, for example, an external host computer and, also, it is possible to cause CPU 25 to generate a program.

Moreover, according to the illustrated embodiment of the present invention, in order for the dither patterns stored in the plural dither RAMs 34 and 35 to be read out, a single set of read-out address counters 31 and 32 for the main scanning direction and the subscanning direction are employed and, with respect to the change in address due to the difference in matrix size of the dither patterns stored in the dither RAMs 34 and 35, arrangement has been made that the initial setting can be accomplished by the initial value setting signals AA0 to AA5 supplied from CPU 25 and, therefore, the circuit can be simplified with peripheral circuits unified to enable the apparatus of the present invention to cope with the dither patterns of various matrix sizes.

Although the present invention has been fully described in connection with the preferred embodiments thereof with reference to the accompanying drawings, it is to be noted that various changes and modifications are apparent to those skilled in the art. For example, although reference has been made to the maximum matrix size of 3FH×3FH of the dither patterns which can be stored in the dither RAMs 34 and 35, the maximum matrix size may not be always limited thereto, but may be smaller or larger than it.

Also, although the initial setting value has been described as equal over the read-out address counters 31 and 32, the read-out address counters 31 and 32 may be initially set at different values. Yet, while a head value of the address is initially set, the head value may be fixed at, for example, 0H to make it possible to determine a final value of the matrix.

Where the dither processing is to be effected to the color image data, an increased number of the dither patterns, their types and their sizes may be required and, therefore, the present invention is advantageous in this respect.

Finally, although reference has been made to the dither processing of color image data, the present invention can be equally applicable to the dither processing of monochromatic image data. In such case, it is necessary for an operator to select one out from the plural dither patterns which the operator may consider optimum, and then to download only the selected dither pattern to the dither RAM so that the digitalization thereof can be accomplished.

Accordingly, such changes and modifications are to be understood as included within the scope of the present invention as defined by the appended claims unless they depart therefrom.

What is claimed is:

1. An image processing apparatus for converting multi-tone image signals to binary image signals in reference to threshold levels arranged in matrix to form a threshold pattern, which apparatus comprises:
   a generating means for generating the multi-tone image signals;
   a first memory means storing a plurality of threshold patterns which are different from each other;
   a selecting means for selecting one of the threshold patterns;
   a second memory means which has a high-speed access ability for storing the threshold pattern selected by said selecting means from said first memory means;
   a writing means for writing the selected threshold pattern from said first memory means in the second memory means;
   a reading means for reading out the selected threshold pattern from said second memory means, said reading means including control means for controlling a reading operation according to a size of the selected threshold pattern stored in said second memory means; and a converting means for converting the multi-tone image signals generated by the generating means to the binary image signals in reference to the threshold levels of the selected threshold pattern which is read out from the second memory means by said reading means.

2. The apparatus according to claim 1, wherein said first memory means is a non-volatile read-only memory, and said second memory means is a random access memory.

3. The apparatus according to claim 1, wherein said generating means includes a scanning means for scanning an original, said writing means is activated before the original is scanned by said scanning means.

4. The apparatus according to claim 1, wherein said second memory means is operable to store a threshold pattern downloaded from an external host.

5. The apparatus according to claim 1, wherein said second memory means is operable to store a threshold pattern generated in the apparatus.

6. A color image processing apparatus for converting multi-tone image signals to binary image signals in reference to threshold levels arranged in matrix to form a threshold pattern and for processing the binary image signals with a plurality of colors, which apparatus comprises:
   a generating means for respectively generating the multi-tone image signals for each color in succession;
   a first memory means which stores a plurality of threshold patterns corresponding respectively to each color;
   a second memory means which as a high-speed access ability for storing one of the threshold patterns from said first memory means;
   a converting means for converting the multi-tone image signals to the binary image signals in reference to the threshold pattern in said second memory means, said converting means including a reading means for reading out the threshold pattern from said second memory means in accordance with a size of the threshold pattern stored in said second memory means;
   a selecting means for selecting one of the threshold patterns in the first memory means in accordance with the color of the multi-tone image signal to be converted by said converting means; and
   a storing means for storing the selected threshold pattern from the first memory means in the second memory means.

7. The apparatus according to claim 3, wherein said first memory means is a non-volatile read-only memory, and said second memory means is a random access memory.

8. An image processing method for converting multi-tone image signals to binary image signals in reference to threshold levels arranged in matrix to form a threshold pattern, which method comprises the steps of:
   generating the multi-tone image signals respectively for each color in succession;
   selecting one of a plurality of threshold patterns which are stored in a first memory means;
   storing the selected threshold pattern from the first memory means in a second memory means which has a high-speed access ability;
   reading out the selected threshold pattern from the second memory means in accordance with a size of the selected threshold pattern; and
   converting the multi-tone image signals to the binary image signals in reference to the threshold pattern which is read out from the second memory means.

9. A color image processing method for converting multi-tone image signals to binary image signals in reference to threshold levels arranged in matrix to form a threshold pattern and for processing the binary image signals with a plurality of colors, which method comprises the steps of:
   generating the multi-tone image signals respectively for each color in succession;
   selecting one of a plurality of threshold patterns stored in a first memory means in accordance with the color of the multi-tone image signal to be processed, said threshold patterns corresponding respectively to each color;
   storing the selected threshold pattern from the first memory means in a second memory means which has a high-speed access ability;
   reading out the selected threshold pattern from the second memory means in accordance with a size of the selected threshold pattern; and
   converting the multi-tone image signals to the binary image signals in reference to the threshold pattern which is read out from the second memory means.

10. An image processing apparatus for converting multi-tone image signals to binary image signals in reference to a threshold pattern, comprising:
    a first memory which stores a plurality of threshold patterns different from each other;
    selecting means for selecting one of the threshold patterns stored in the first memory;
    a second memory which has a high-speed access ability;
    storing means for storing the threshold pattern selected by said selecting means in the second memory; and
    converting means for converting the multi-tone image signals to the binary image signals in reference to the threshold pattern stored in the second memory, said converting means including reading means for reading out the threshold pattern from the second memory in accordance with a size of the threshold pattern in the second memory.

11. A method of converting multi-tone image signals to binary image signals in reference to a threshold pattern, the steps comprising:
    providing a first memory which stores a plurality of threshold patterns different from each other;
    providing a second memory which has a high-speed access ability;
    selecting one of the threshold patterns stored in the first memory;
    storing the selected threshold pattern in the second memory;
    reading out the selected threshold pattern from the second memory in accordance with a size of the selected threshold pattern; and
    converting the multi-tone image signals to the binary image signals in reference to the selected threshold pattern read out from the second memory.

12. An image processing apparatus for converting multi-tone image signals to binary image signals in reference to a threshold pattern, comprising:
    scanning means for scanning an original and generating the multi-tone image signals;

a non-volatile read-only memory which stores a plurality of threshold patterns different from each other;

selecting means for selecting one of the threshold patterns stored in the read-only memory;

a random access memory which has a high-speed access ability for storing the threshold pattern selected by said selecting means;

first means for reading out the threshold pattern selected by said selecting means from the read-only memory and writing the same in the random access memory;

second means for reading out the threshold pattern from the random access memory in accordance with a size of the threshold pattern in the random access memory; and means responsive to said second means for converting the multi-tone image signals to the binary image signals in reference to the threshold pattern stored in the random access memory.

13. The apparatus according to claim 12, wherein said first means is activated before the original is scanned by said scanning means.

* * * * *

UNITED STATES PATENT AND TRADEMARK OFFICE
CERTIFICATE OF CORRECTION

PATENT NO. : 5,177,623
DATED : January 5, 1993
INVENTOR(S) : Yoshihiko Hirota

It is certified that error appears in the above-identified patent and that said Letters Patent is hereby corrected as shown below:

On the title Page, in lines 10 and 11 of the Abstract paragraph, change "thereshold" to --threshold--.

In Col. 9, line 13 (Claim 3, line 3), before "said", insert --and--.

In Col. 9, line 33 (Claim 6, line 13), change "as" to --has--.

Signed and Sealed this

Twenty-sixth Day of October, 1993

Attest:

BRUCE LEHMAN

Attesting Officer

Commissioner of Patents and Trademarks